United States Patent
Takata et al.

(10) Patent No.: US 6,597,282 B2
(45) Date of Patent: Jul. 22, 2003

(54) SPREAD SPECTRUM TRANSMISSION SYSTEM

(75) Inventors: Hajime Takata, Toyama (JP); Tooru Takakura, Toyama (JP); Masahide Sakamoto, Toyama (JP)

(73) Assignee: SMK Corporation, Tokyo (JP)

( * ) Notice: Subject to any disclaimer, the term of this patent is extended or adjusted under 35 U.S.C. 154(b) by 84 days.

(21) Appl. No.: 09/815,124

(22) Filed: Mar. 22, 2001

(65) Prior Publication Data

US 2001/0050944 A1 Dec. 13, 2001

(30) Foreign Application Priority Data

May 31, 2000 (JP) .......................................... 2000-161786

(51) Int. Cl.[7] ............................................. H04M 11/04
(52) U.S. Cl. ........................... 340/310.01; 340/310.03; 340/310.08; 375/130
(58) Field of Search ....................... 340/310.01, 310.03, 340/310.08; 375/130, 131, 135, 136

(56) References Cited

U.S. PATENT DOCUMENTS 6,254,201 B1 * 7/2001 Lesesky et al. ........ 303/122.02
6,430,210 B1 * 8/2002 McGrath et al. ............ 375/130

FOREIGN PATENT DOCUMENTS

| EP | 0395494 | 10/1990 |
| JP | 620247635 | 10/1987 |

* cited by examiner

Primary Examiner—Julie Lieu
(74) Attorney, Agent, or Firm—Darby & Darby

(57) ABSTRACT

An inexpensive spread spectrum transmission system prevents the infiltration of external noise and external leakage of spread spectrum signals by separating electrical power for load devices from electrical power for communication. A plug socket for terminal connection receives a plug for terminal connection of a spread spectrum communication terminal apparatus. The plug for terminal connection is connected to the alternating current power supply line through a blocking filter which blocks electrical noise from entering the spread spectrum terminal apparatus, and prevent spread spectrum signals from passing in the reverse direction. Since the alternating current power supply line for communications carries only light loads, an inexpensive, low-capacity blocking filter is adequate as the blocking filter.

4 Claims, 3 Drawing Sheets

SPREAD SPECTRUM TRANSMISSION SYSTEM

BACKGROUND OF THE INVENTION

1. Field of the Invention

The present invention relates to a power-line carrier method using power transmission lines as communications lines, and more specifically, to a spread spectrum transmission system which transmits data by superimposing spread spectrum modulated signals (hereinafter called as S signals on commercial power lines.

2. Detailed Description of the Related Art

The spread spectrum transmission system is a communication system using the spread spectrum modulation method. Spread spectrum transmission was originally conventionally developed mainly for military use. The communications are encrypted by means of a spread code used as the key. Since the transmitted electric power is spread over a wide bandwidth, spectrum density can be lowered, making it possible to maintain even the existence of the communications secret. Meanwhile, since the spread spectrum transmission system transmits data by spreading it over a wide bandwidth, it is possible to transmit data even if the signal strength of the signal electric power is, in places, weaker than the noise of the transmission line. In recent years, based on these observations, a commercial spread spectrum transmission system has been developed using commercial electric power lines as signal transmission lines, for such applications as the remote control of machine tools in factories, where the generation of noise cannot be avoided.

Referring to FIG. 3, a conventional spread spectrum transmission system 100, employed for such applications as the remote control of machine tools inside a factory, uses the same commercial electric power line 101 wired from outside the building to the inside of the factory via a breaker 102. A blocking filter 103 connected downstream of the breaker 102 prevents the infiltration of external electrical noise via the breaker 102 from the transmission lines of an electric power company. Additionally, the blocking filter 103 is installed so as to prevent the external leakage of SS signals flowing along the commercial electric power lines 101a and 101b inside the factory, to be described later.

A plurality of commercial electric power lines 101a and 101b branch to each process within the factory, including assembly lines, molding lines, and the like, and to plug sockets 104, 104 . . . The plug sockes 104 are installed at convenient locations along the power lines 101a/101b to provide power to load devices such as machine tools and electrical apparatuses.

For example, the socket plugs of a press molding device 105 and an illuminating device 106 are connected to the plug sockets 104, 104 . . . of the commercial electric power line 101a. The socket plugs of assembling devices 107 and 108 are connected to the plug sockets 104, 104 . . . of the commercial electric power line 101b. Commercial alternating current power is thus supplied to each load device.

The socket plugs of a plurality of spread spectrum communication terminal apparatuses 109a, 109b, 109c, and 109d are plugged into freely selected remaining plug sockets 104, 104 . . . of the commercial electric power lines 101a and 101b. These spread spectrum communication terminal apparatuses 109 are each equipped with an input-output portion which inputs and outputs communication signals, and a spread spectrum modem apparatus (hereinafter called as S modem) which modulates and demodulates between communication signals and SS signals. Each S modem superimposes SS communication signals onto the commercial electric power line 101 to which its socket plug is connected. In addition each S modem outputs SS signals flowing on the commercial electric power line 101 as communication signals, to or from the input-output portion.

For example, the spread spectrum communication terminal apparatus 109a connected to the commercial electric power line 101a is installed adjacent the press molding device 105. The spread spectrum communication terminal apparatus 109a receives and decodes communication signals indicating operational information of the press molding device 105. Information to and from the spread spectrum communication terminal apparatus 109a passes along communication cables shown as dotted lines in the drawing. This operational information is superimposed on the commercial electric power line 101a as SS signals, demodulated to communication signals by the spread spectrum communication terminal apparatus 109b similarly connected to the commercial electric power line 101a, and output to a personal computer (hereinafter called as PC 110 connected to the input-output portion of the spread spectrum communication terminal apparatus 109b. Additionally, the PC 110 can output control information for controlling the press mold 105. Communication signals representing the control information are sent to the press molding device 105 via the commercial electric power line 101a, by flow in the opposite direction to that described above.

In the same way, communication signals can be transmitted between assembling devices 107 and 108 and a PC 111 installed in a freely chosen location, by means of the spread spectrum communication terminal apparatus 109c connected to the assembling devices 107 and 108. These communication signals travel along the communication cables shown by the dotted lines, and a spread spectrum communication terminal apparatus 109d connected to the PC 111. Moreover, if PC 110 and PC 111 are connected to another communication network 112, all machine tools in the factory can be centrally managed from a host computer, not shown in the drawing, connected to the communication network 112 (noted as a local area network LAN).

Thus, with the spread spectrum transmission system 100 using the commercial electric power line 101, it is possible to connect an SS modem, which modulates and demodulates SS signals between data terminal apparatuses (control-receiving apparatuses), using a commercial electric power line 101, and transmit data between the spread spectrum communication terminal apparatuses 109 using this commercial electric power line 101 as a signal transmission line. Consequently, in an environment having ordinary power supply equipment, it is possible to easily transmit data between terminal apparatuses without preparing a new communication line.

With the above-mentioned conventional spread spectrum transmission system 100, blocking filter 103 is required after the breaker 102 which is the lead-in for the commercial electric power line 101 from outside the facility, in order to prevent the infiltration of external noise, and to prevent external leakage of SS signals superimposed over commercial power lines inside the factory.

However, in order to serially interpose the blocking filter 103 in the commercial electric power line 101 through which all the load devices in the factory are supplied with electric power, blocking filter 103 must be an expensive, high-capacity blocking filter.

Additionally, the spread spectrum modulation method is not easily impacted by noise because it diffuses noise by back-diffusion during demodulation. However, machine tools inside a factory are prone to generate high levels of noise which can produce an outflow of electrical noise to the commercial electric power line 101. Consequently, in order to conduct stable communications using a commercial electric power line 101 as a communication line, a noise filter is required on each load device, increasing the overall cost of the system.

OBJECTS AND SUMMARY OF THE INVENTION

An object of the present invention is to provide an inexpensive spread spectrum transmission system which prevents the infiltration of external noise, and prevents the external leakage of SS signals.

Additionally, another object of the present invention is to provide a spread spectrum transmission system which allows stable communication by means of SS signals, without installing filters on load devices receiving commercial alternating current electric power.

In order to solve the above-mentioned problems, a first aspect of the present invention is a spread spectrum transmission system comprising: a commercial electric power line, equipped with a plug socket, and supplying commercial alternating current electric power to a load device, an electrical plug of which is connected to the plug socket; an alternating current power supply line for communications one end of which being equipped with an electrical plug plugged into the plug socket, and connected to the commercial electric power line; a plug socket for terminal connection, being connected to the alternating current power supply lines for communications at at least one position of the alternating current power supply lines for communications; a blocking filter interposed on the alternating current power supply lines for communications between the electrical plug and the plug socket for terminal connection; and a spread spectrum communication terminal apparatus, having a communication signal input-output portion and a spread spectrum modem portion, and which, with respect to the alternating current power supply line for communications connected by plugging the plug for terminal connection into the plug socket for terminal connection, superimposes a modulated communication signal as a spread spectrum modulated signal thereon, or isolates a spread spectrum modulated signal therefrom and demodulates it into a communication signal.

The load devices are connected to the commercial electric power line, the electrical plugs of the load devices are plugged into the plug sockets of the electric power line to supply commercial alternating current electric power thereto from the commercial electric power line. Additionally, the spread spectrum communication terminal apparatus is connected to the alternating current power supply line for communications, which is connected to the commercial electric power line via the blocking filter, and spread spectrum modulated signals are superimposed on the alternating current power supply line for communications, using the alternating current power supply line for communications as a communications line.

External noise transmitted from the commercial electric power line, and noise generated by the load devices are prevented from infiltrating into the alternating current power supply line for communication by the blocking filter interposed in the alternating current power supply line for communication, and SS signals superimposed on the alternating current power supply line for communication are cut off by the blocking filter, and are not leaked outside the facility.

Since only devices with small loads, such as spread spectrum communication terminal apparatuses, are connected to the alternating current power supply line for communication, only small amounts of current flow thereon, and a high-capacity blocking filter is not required.

Additionally, since the blocking filter prevents noise generated by load devices from being transmitted to the spread spectrum communication terminal apparatuses, blocking filters on each load device can be omitted.

A second aspect of the present invention is the spread spectrum transmission system according to the first aspect, further characterized in that the plug for terminal connection is formed in the same shape as the plug socket, and is freely connected to the plug sockets installed on the commercial electric power line.

It is possible to plug the electrical plug of a conventional spread spectrum communication terminal apparatus, which had been plugged into a plug socket of a commercial electric power line, into the plug socket for terminal connection of the alternating current power supply line for communication as a plug for terminal connection. Consequently, it is possible to use a conventional spread spectrum communication terminal apparatus as the spread spectrum communication terminal apparatus connected to an alternating current power supply line for communication according to the first aspect, without any modification.

In an application without the problems of noise infiltration or leakage of SS signals, the spread spectrum communication terminal apparatus can be connected to the commercial electric power line to which other load devices are connected without any modification.

A third aspect of the present invention is the spread spectrum transmission system according to the second aspect, further characterized in that the alternating current power supply line for communication is freely separable at one side of the blocking filter, by the plug socket being installed on one side of the blocking filter and an electrical plug installed on one end of an alternating current power supply line for communication connected with the plug socket for terminal connection.

The alternating current power supply line for communication separated at the blocking filter has the same construction as an existing power supply cable with attached plug socket which is connected to a commercial electric power line, and this existing power supply cable can be used as-is as a portion of the alternating current power supply line for communication.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
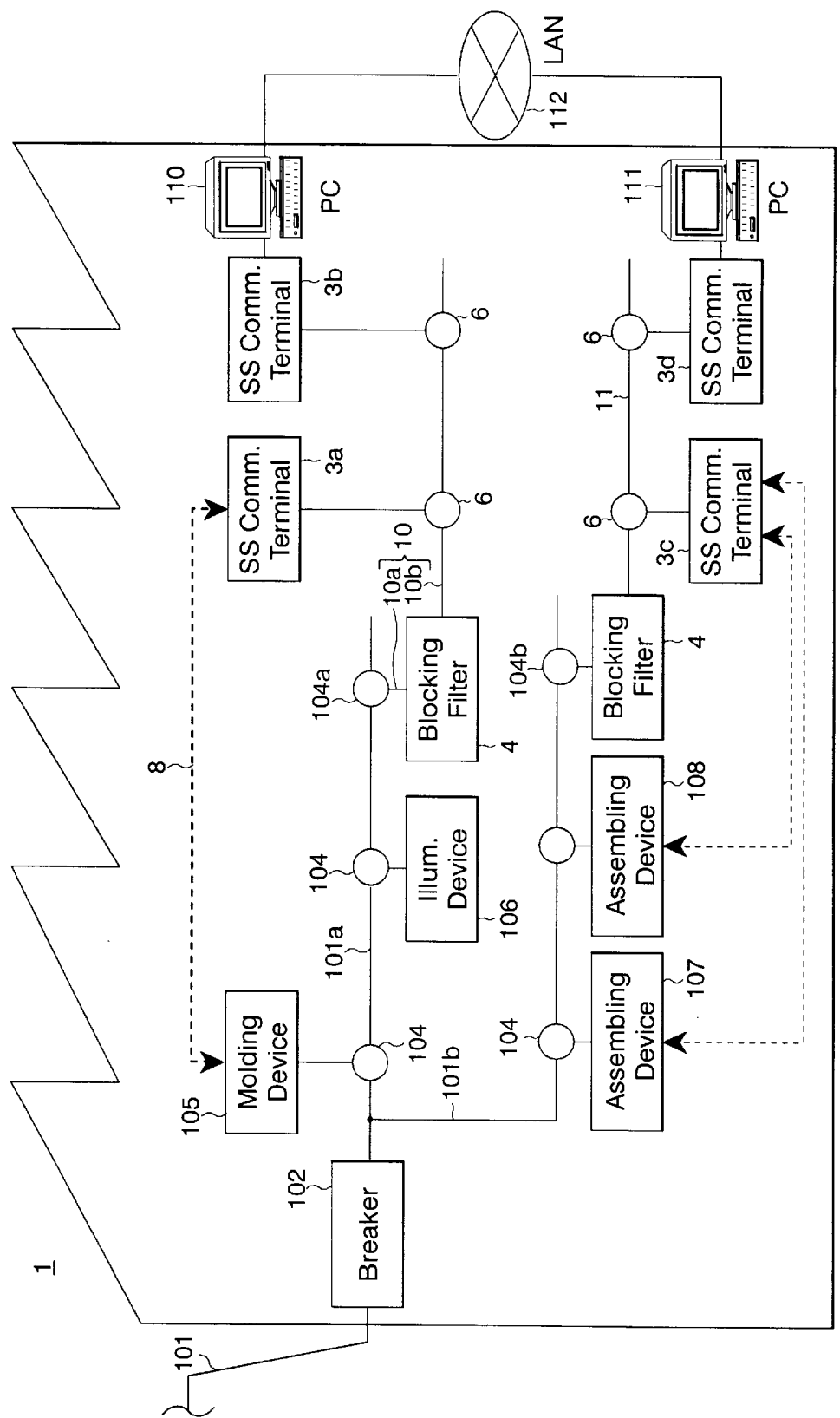
FIG. 1 is a block diagram showing an overall spread spectrum transmission system according to an embodiment of the present invention.

Referring to FIG. 1, only a breaker 102 is installed between the external commercial electric power line 101 and the factory-internal commercial electric power lines 101*a* and 101*b* branching to each line therefrom. This results from the fact that a high-capacity blocking filter is not required.

A plurality of plug sockets 104, 104 . . . are formed on the commercial electric power line 101*a* branching from the commercial electric power line. Load devices such as a press molding device 105 and illuminating device 106 are connected by plugging their electrical plugs into the plug sockets 104, 104 . . . , whereby they are supplied with commercial alternating current electric power.

Figure 2:
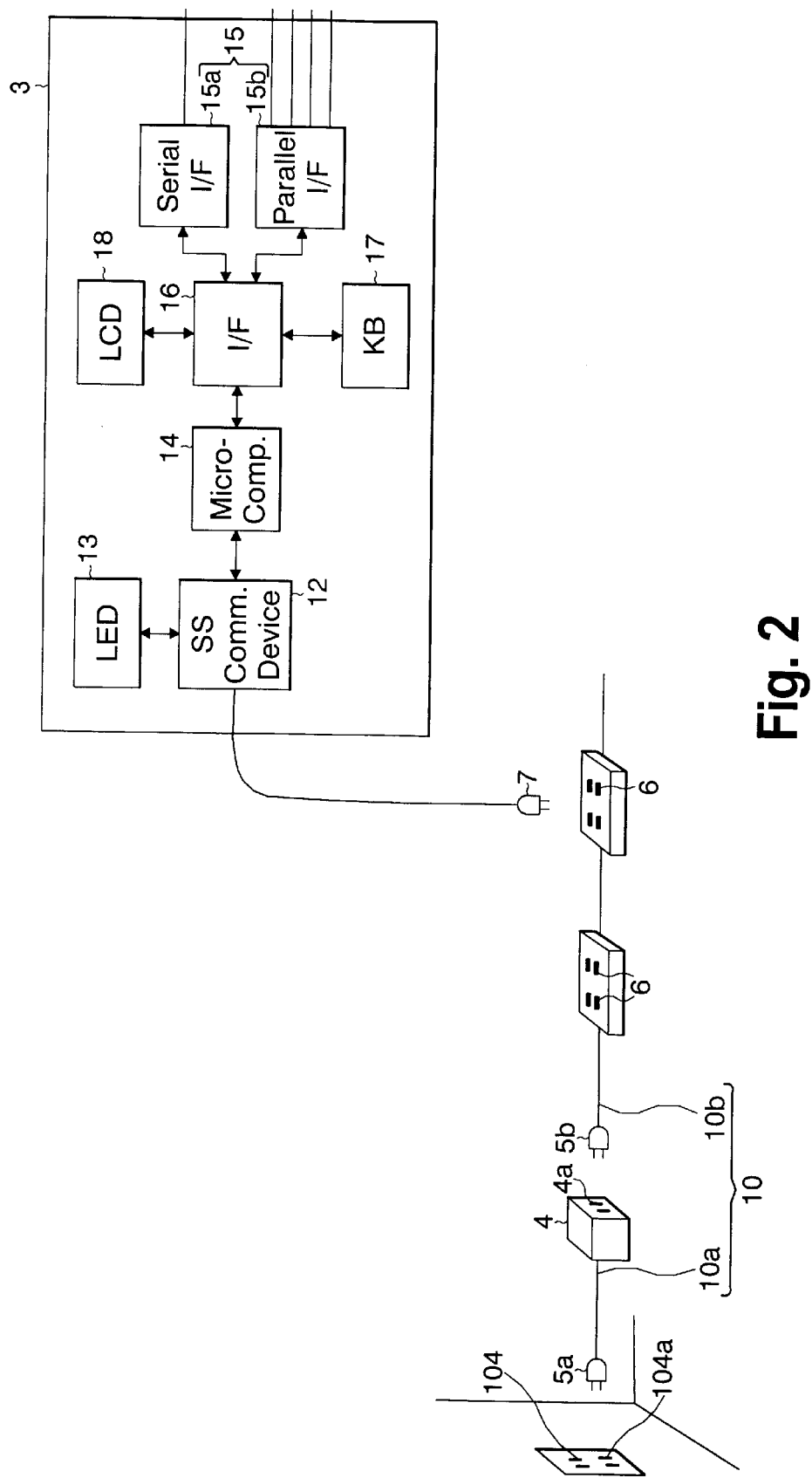
FIG. 2 is a block diagram showing a construction of the alternating current power supply line for communication and spread spectrum communication terminal apparatus.
Figure 3:
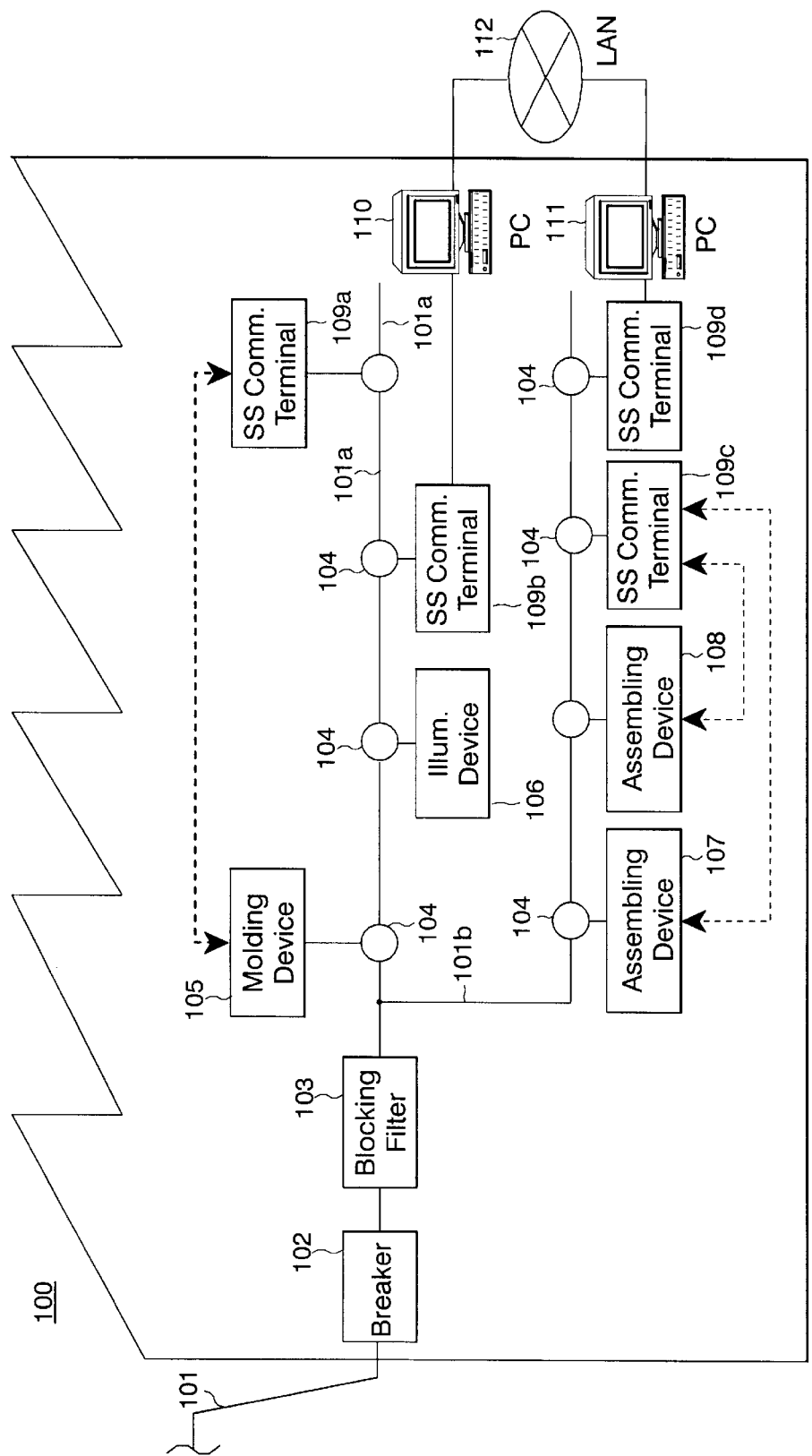
FIG. 3 is a block diagram showing a conventional overall spread spectrum transmission system.

Referring now to FIG. 2, one of these locations is a plug socket 104*a*, into which is plugged an electrical plug 5*a*. Electrical plug 5*a* is connected on a power line for communications 10*a* to a blocking filter 4. The blocking filter 4 includes a plug socket 4*a*. An electrical plug 5*a* is connected to plug socket 4*a* to supply communications power on a power line for communications 10*b* to a plurality of plug sockets for communications 6,6. The plug socket 4*a* has the same shape as the plug socket 104 installed on the commercial electric power line 101. Plugging the plugs 5*a* and 5*b* into the plug sockets 104 and 4*a* in this way serially interposes the blocking filters 4 in the alternating current power supply line for communication 10 made up of the alternating current power supply lines for communication 10*a* and 10*b*.

A plurality of plug sockets for terminal connection 6, 6 . . . are formed at appropriate locations on alternating current power supply line for communication 10*b*, and spread spectrum communication terminal apparatuses 3*a* and 3*b* are connected thereto by plugging plugs for terminal connection 7 matching these plug sockets for terminal connection 6 therein.

Here, the plug sockets for terminal connection 6 have the same shape as the plug socket 104. The plugs for terminal connection 7 have the same shape as the electrical plugs 5*a* and 5*b*. Consequently, an ordinary electric power cord equipped with a plug socket 104 capable of being connected to a commercial electric power line 101 can be used to connect the alternating current power supply line for communication 10*b* through the plug sockets for terminal connection 6.

As shown in FIG. 1, the spread spectrum communication terminal apparatus 3*a*, connected to the alternating current power supply line for communication 10*b*, is connected to the press molding device 105 by the communication cable 8 shown by the dotted line. This spread spectrum communication terminal apparatus 3*a* is preferably installed adjacent the press molding device 105, but as it can be wired to the alternating current power supply line for communication 10 by plugging the electrical plug 5*a* to a plug socket 104 in a freely chosen location. However, the spread spectrum communication terminal apparatus 3 can be installed in any convenient location.

Another commercial electric power line 101*b* supplies commercial alternating current electric power to each machine tool on an assembly line. Load devices, such as assembling devices 107 and 108 are connected to the electric power line 101*b* by plugging their electrical plugs into a plurality of plug sockets 104, 104 . . .

One of these locations is a plug socket 104*b*, into which is plugged an electrical plug installed on one end of an alternating current power supply line for communication 11, connecting the two. A blocking filter 4 is serially interposed in the alternating current power supply line for communication 11 adjacent this electrical plug. Consequently, the alternating current power supply line for communication 11 and blocking filter 4 are formed as a single unit. A separate blocking filter 4 is not required. A plurality of plug sockets for terminal connection 6,6 . . . are formed at appropriate intervals on the alternating current power supply line for communication 11 on the downstream side of the blocking filter 4 and the other side of the electrical plug. Spread spectrum communication terminal apparatuses 3*c* and 3*d* are connected to the alternating current power supply line for communication by plugging plugs for terminal connection 7 matching these plug sockets for terminal connection 6 therein.

The blocking filters 4, 4 used here prevent external electrical noise transmitted over the transmission lines of an electric power company, and high levels of noise generated by machine tools, from infiltrating into the alternating current power supply lines for communication 10*b* and 11. In addition, they prevent the external leakage of SS signals superimposed on the alternating current power supply line for communication 10*b* and 11 through the commercial electric power line 101. Consequently, in the same manner as the above-mentioned blocking filter 103, the blocking filters 4, 4 cut off signals superimposed on electric power lines in two directions, but the blocking filter 4 used in the present embodiment can have a low capacity conforming to the rating of the alternating current power supply lines for communication 10 and 11, since only devices with small electrical loads, such as spread spectrum terminal apparatuses, are connected to the alternating current power supply lines for communication 10*b* and 11.

Although there is no particular limit on the combined length of the alternating current power supply lines for communication 10 and 11 interposed by blocking filters 4, its length can be extended to at least about 200 meters. This permits wiring for a spread spectrum communication terminal apparatus 3 to be installed in a freely chosen required location within the factory, to mate with a plug socket 104 in a freely chosen location.

Additionally, the alternating current power supply lines for communication 10 and 11 not only input and output SS signals to and from the spread spectrum communication terminal apparatus 3, but also supply them with electric power for operation, and it is also permissible for plugs for terminal connection 7 to be plugged into the remaining plug sockets for terminal connection 6, 6 . . . , connecting such load devices as PCs 110 and 111 and illuminating devicees and supplying them with alternating current electric power, so long as devices which generate high noise levels, such as machine tools, are not included in the loads. Thus, for example, it is possible to extend the alternating current power supply line for communication 10*b*/11 to a location with low noise, and there to supply electric power to PCs installed in this sheltered location, while at the same time conducting two-way communications between these PCs and load devices installed in high-noise environments.

Referring now to FIG. 2, the spread spectrum communication terminal apparatus 3 includes a spread spectrum communication device 12 (a SS modem) connected to the alternating current power supply lines for communication 10, 11 via a plug for terminal connection 7. An LED display portion 13 is connected to the spread spectrum communication modem 12. A microcomputer 14, connected to the spread spectrum communication modem 12, controls the operations and input-output signals of each portion inside the spread spectrum communication terminal apparatus 3. An external input-output portion 15 includes a serial interface portion 15*a* and parallel interface portion 15*b*. An interface portion 16 is connected between the microcomputer 14 and external input-output portion 15. A keyboard input portion 17 and a liquid crystal display portion 18 are connected to the microcomputer 14 via the interface portion 16.

The spread spectrum communication modem 12 modulates communication signals into SS signals, and demodulates SS signals into communication signals. More specifically, the spread spectrum communication modem 12 modulates communication signals input from the external input-output portion 15 via the microcomputer 14 into SS signals, and superimposes them on the alternating current power supply lines for communication 10 and 11, or isolates SS signals superimposed on alternating current power supply lines for communications 10 and 11, demodulates them into communication signals output from the external input-output portion 15 via the microcomputer 14. Additionally, the LED display portion 13 visually displays the operational status of the spread spectrum communication modem 12 by blinking its LED.

The external input-output portion 15 conducts two-way transmission of communication signals between other devices via communication cables. For example, as shown in FIG. 1, the external input-output portion 15 of each spread spectrum communication terminal apparatus 3*a*, 3*b*, 3*c*, and 3*d* is connected to the input-output portions of the press molding device 105, PC 110, assembling devices 107 and 108, and PC 111 (the input-output portions 15 are shown in FIG. 2, and are omitted from FIG. 1). The spread spectrum communication terminal apparatus 3 is equipped with the serial interface portion 15*a* and parallel interface portion 15*b* to match the input-output formats of the communication signals of these devices. By choosing an appropriate serial or parallel input-output connection, according to the needs of the device receiving and sending information, two-way communication of communication signals is conducted with each device.

The keyboard input portion 17 inputs operational parameter configurations to the microcomputer 14 of the spread spectrum communication terminal apparatus 3. The the liquid crystal display portion 18 displays the input and the results of this input.

By the above-described construction, the spread spectrum communication terminal apparatus 3 superimposes communication signals sent by each device 105, 110, 107, 108, and 111 on the alternating current power supply lines for communication 10 and 11 as SS signals, and isolates SS signals superimposed on the alternating current power supply lines for communication 10 and 11, and send them to each of the above-mentioned devices.

With the disclosed spread spectrum transmission system 1, for example, communication signals sent from the PC 110 to the press molding device 105 and vice versa are sent to the other device via the spread spectrum communication terminal apparatuses 3*a* and 3*b* and alternating current power supply line for communication 10. In the same way, communication signals sent from the PC 111 to the assembling devices 107 and 108 and vice versa are sent to the other party via the spread spectrum communication terminal apparatuses 3*c* and 3*d* alternating current power supply line for communication 11.

Consequently, it is possible to conduct two-way communications between the PC 110 and press molding device 105, or between the PC 111 and assembling devices 107 and 108, just as if they were connected via communication cables, but without wiring communication cables. In some applications, communication by cables cannot be used to connect distant devices, due to the infiltration of noise and signal attenuation. However, the present invention enables communication by simply connecting PCs and other devices to alternating current power supply lines for communication 10 and 11 which supply electric power as well as communication. This enables two-way communications between each device over whatever distances are necessary.

Thus, if alternating current power supply lines for communication 10 and 11 are wired to each line in the factory separated by process or product, it is possible to manage each of a plurality of machine tools on that line via a single PC 110 or 111, connected to the same alternating current power supply line for communication 10 or 11 as the machine tolls via a spread spectrum communication terminal apparatus 3. Moreover, if PCs 110 and 111 act as terminals on a communication network 112, either or both can control every load device, and collect operational information for each load device, by means of a host computer connected to the communication network 112. Note that it is also possible for the host computer to serve as PC 110 or PC 111.

According to the present embodiment, SS signals modulated by the spread spectrum communication terminal apparatus 3 are superimposed on the alternating current power supply lines for communication 10 and 11. However, since backflow of SS signals to the commercial electric power line 101 are prevented by means of the blocking filters 4, the confidentiality of the SS communication signals is not compromised via the commercial electric power line 101.

Conversely, since noise transmitted along the commercial electric power line 101 from machine tools and other load devices is cut off by the blocking filters 4, and not transmitted to the alternating current power supply lines for communication 10*b* or 11, it is easy to isolate just the SS signals, enabling the maintenance of stable communication quality. Consequently, individual noise filters are not required on each machine tool.

In the present embodiment, the plugs for terminal connection 7 and plug sockets for terminal connection 6 have the same shapes as the plug socket 104 and electrical plugs 5*a* and 5*b*, respectively. However, it is permissible for the plugs for terminal connection 7, and the plug sockets for terminal connection 6 into which the plugs for terminal connection are plugged, to have different dimensions from items connected to the commercial electric power line 101. Making the sockets and plugs in different shapes or sizes helps the installer distinguish between connections to the alternating current power supply lines for communications 10 and 11 and connections to the commercial electric power line 101, preventing mistaken connections.

Moreover, the above-mentioned embodiment was described with connections between each load device and the input-output portion of the spread spectrum communication terminal apparatus via a wired communication cable, but if the transmission environment is one in which SS signals will not become confused, it is permissible for two-way communications to be conducted using infrared SS signals, with wireless/infrared signals as a carrier wave.

According to the first aspect of the present invention, it is possible to prevent the infiltration of external noise transmitted from commercial electric power lines, and of noise generated by load devices, without demodulation errors from SS signals being generated, using only an inexpensive blocking filter.

Additionally, it is possible to maintain stable communication quality without installing noise filters on each device, since noise generated by load devices is not transmitted to the alternating current power supply line for communication to which spread spectrum communication terminal apparatuses are connected.

According to the second aspect of the present invention, it is also possible to use conventional spread spectrum communication terminal apparatuses as the spread spectrum communication terminal apparatuses connected to alternating current power supply line for communication, without any modifications. Additionally, in a state free of the problems of noise infiltration and SS signal leakage, it is possible to connect the spread spectrum communication terminal apparatuses to the commercial electric power lines to which other load devices are connected with no modifications, thus enabling power line carrier communication with the commercial electric power line serving as a communication line.

According to the third aspect of the present invention, in addition to the added effects of the second aspect of the invention, it is possible to use a conventional electric power cable equipped with an electrical plug to be used as a portion of the alternating current power supply line for communication separated by blocking filters as-is.

Having described preferred embodiments of the invention, as presently understood, with reference to the accompanying drawings, it is to be understood that the invention is not limited to those precise embodiments, and that various changes and modifications may be effected therein by one skilled in the art without departing from the scope or spirit of the invention as defined in the appended claims. It is intended that the appended claims cover all such modifications as fall within the true spirit and scope of the invention.

What is claimed is:

1. A spread spectrum communication system for communication with at least one load device, comprising:
    a first electric power line connected to a source of electric power;
    means for connecting said load device to said first electric power line;
    a blocking filter connected to said first electric power line;
    said blocking filter being of a type effective for blocking electrical noise and spread spectrum signals from passing therethrough;
    a second electric power line connected to said blocking filter;
    said second electric power line being a power line for communications;
    a spread spectrum terminal apparatus connected to said second electric power line;
    said spread spectrum terminal apparatus being of a type effective for converting signals between communication signals and spread spectrum communication signals;
    and means for communication of said spread spectrum communication signals with said load device, without said spread spectrum communication signals passing along said first electric power line.

2. A spread spectrum transmission system, comprising:
    a plug socket connectable to a commercial electric power line;
    an electrical plug fittable into said plug socket for supplying commercial alternating current electric power to a load device;
    an alternating current power supply line for communications;
    one end of said alternating power supply line for communications being equipped with an electrical plug capable of being plugged into said plug socket for connection to said commercial electric power line;
    a plug socket for terminal connection connected to said alternating current power supply line for communications in at least one position along said alternating current power supply line for communications;
    a blocking filter interposed on said alternating current power supply line for communications between said electrical plug and plug socket for terminal connection;
    a spread spectrum communication terminal apparatus having a plug for terminal connection;
    said spread spectrum communication terminal apparatus being connected to said alternating current power supply line for communications;
    said spread spectrum communication terminal apparatus having a communication signal input-output portion and a spread spectrum modem portion;
    connection of said spread spectrum communication terminal apparatus to said alternating current power supply line for communication being connected by plugging said plug for terminal connection into said plug socket for terminal connection;
    said spread spectrum communication terminal apparatus being effective to perform at least one of superimposing a spread spectrum modulated communication signal on said alternating current power supply line for communication, or isolating a spread spectrum modulated signal from said alternating current power supply line for communication and demodulating said spread spectrum modulated communication into a communication signal.

3. The spread spectrum transmission system according to claim 2, wherein said plug for terminal connection has the same shape as said electrical plug, whereby said plug for terminal connection is freely connectable to any plug socket installed on said commercial electric power line.

4. The spread spectrum transmission system according to claim 3 wherein said alternating current power supply line for communication is freely separable at one side of said blocking filter, by installation of said plug socket on one side of said blocking filter and an electrical plug on one end of an alternating current power supply line for communication connected with the plug socket for terminal connection.

* * * * *